Figure 1:
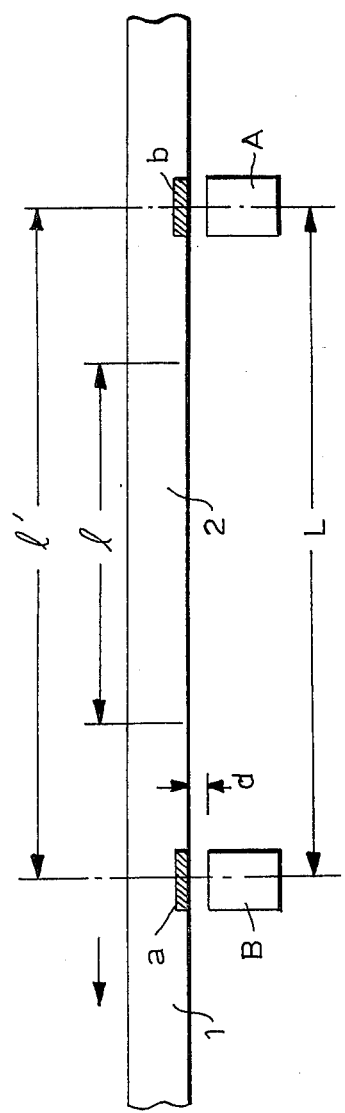

United States Patent [19]

Asakawa

[11] 4,106,005

[45] Aug. 8, 1978

[54] APPARATUS FOR DETECTING ELONGATION OF A JOINT OF A CONVEYOR BELT

[75] Inventor: Akira Asakawa, Toyonaka, Japan

[73] Assignee: Nippon Konbeya Kabushiki Kaisha, Daito, Japan

[21] Appl. No.: 796,829

[22] Filed: May 13, 1977

Related U.S. Application Data

[63] Continuation-in-part of Ser. No. 686,667, May 14, 1976, abandoned, which is a continuation-in-part of Ser. No. 597,814, Jul. 21, 1975, abandoned.

[51] Int. Cl.$^2$ .................. G08B 21/00; B65G 43/00
[52] U.S. Cl. .................................. 340/676; 198/856; 324/208
[58] Field of Search ................. 340/259; 324/208; 198/856

[56] References Cited

U.S. PATENT DOCUMENTS

| | | | |
|---|---|---|---|
| 2,485,285 | 10/1949 | Harris | 324/208 X |
| 2,963,293 | 12/1960 | Klein | 340/259 |
| 2,989,690 | 6/1961 | Cook | 324/208 X |
| 2,996,630 | 8/1961 | Bensema et al. | 340/259 X |
| 3,146,432 | 8/1964 | Johnson | 340/259 X |
| 3,289,073 | 11/1966 | Loeffler | 324/208 |
| 3,750,129 | 7/1973 | Takeno et al. | 340/259 X |
| 3,851,323 | 11/1974 | Eltgen | 340/259 X |
| 3,922,661 | 11/1975 | Enabnit et al. | 340/259 |
| 4,020,945 | 5/1977 | Takeno et al. | 198/856 |

Primary Examiner—David L. Trafton

[57] ABSTRACT

An apparatus for detecting elongation of the joint of a conveyor belt has a pair of sensors, each of which includes an iron core having a coil winding therearound and being spaced at a predetermined distance from each other parellel with the conveyor belt and which distance is greater than the length of the joint along the belt. A pair of magnetic elements is fixed to the underside surface of the belt, the magnetic elements being spaced from each other a distance equal to the distance between the sensors when the joint is unelongated, so that said sensors and elements are aligned during movement of the conveyor belt past the sensors. A waveform shaping circuit is coupled to each of the sensors, a pulse generator is coupled to the sensor which is ahead of the other sensor in the direction of movement of the conveyor belt for generating a pulse in response to the output of the sensor having a duration corresponding to the maximum permissible elongation of the joint of the conveyor belt, and logic circuit means is coupled to the outputs of the pulse generator and the waveform shaping circuit coupled to the other sensor for producing an output when a delay which is longer than the delay corresponding to the maximum permissible elongation of the joint occurs between the output of the waveform shaping circuits. An alarm or a belt drive shut-down device is coupled to the logic circuit means and is actuated by the output of the logic circuit means for responding to an elongation of the joint which is greater than the maximum permissible elongation.

6 Claims, 2 Drawing Figures

APPARATUS FOR DETECTING ELONGATION OF A JOINT OF A CONVEYOR BELT

This application is a continuation-in-part of Ser. No. 686,667, filed May 14, 1976, now abandoned, which in turn is a continuation-in-part of Ser. No. 597,814, filed Jul. 21, 1975, now abandoned.

This invention relates to an apparatus for detecting fatigue-caused elongation of a conveyor belt at the joint thereof.

It is commonly known that a conveyor belt is subjected to tension at the joint thereof, especially when it contains steel cords therein, such a belt being likely to develop an elongation at the joint that will finally result in the severance thereof at the elongated joint. p This invention has as an object the provision of an apparatus for detecting the elongation of a conveyor belt at the joint thereof, thereby obviating the possibility of an accidental severance of the conveyor belt, for example during the use thereof.

The apparatus according to this invention comprises a pair of sensors, a pair of magnetic elements, and an indicating system and integrated circuits connecting these parts closely to each other.

Figure 2:
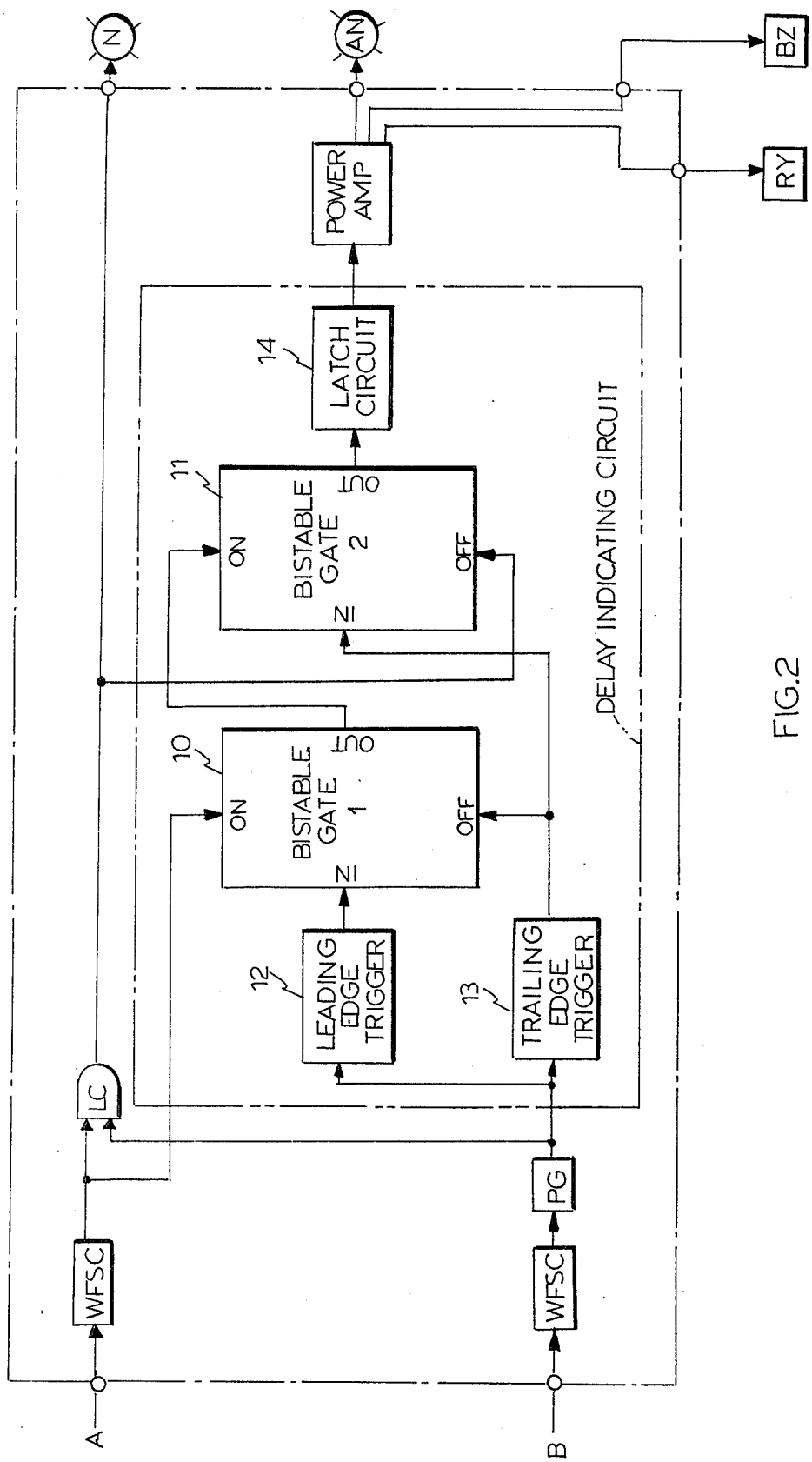

In order that this invention may be more readily understood, it will be more fully described with reference to the accompanying drawings which illustrates an embodiment of this invention, wherein:

FIG. 1 is a diagrammatic plan view of a conveyor belt, a pair of sensors and a pair of magnetic elements operably disposed relative to each other in accordance with this invention; and FIG. 2 is a circuit diagram of a combination of integrated circuits connected to the pair of sensors, an alarm and a normality indicator.

In FIG. 1 there is shown schematically an endless conveyor belt 1 moving counterclockwise as indicated by the arrow, and having a joint 2 therein with a length $l$. A pair of magnetic elements $a$ and $b$ is mounted on the belt, one on each side of the joint and normally spaced at a distance $l'$ from each other in the direction of the length of the belt 1. A pair of sensors A and B are fixed at points along said belt 1 at a distance L from each other.

In FIG. 2, a waveform shaping circuit WFSC is connected to the outputs of each of the sensors A and B, and the output of the waveform whaping circuit for sensor A is connected to an AND circuit, and the output of the waveform shaping circuit for sensor B is connected to a pulse generator PG, the output of which is also connected to the AND circuit. The output from the AND circuit is supplied to an "N" lamp for indicating normal belt condition. The outputs of the pulse generator PG, the waveform shaping circuit for the sensor A and the AND circuit are supplied to a combination activation-deactivation circuit and delay sensing circuit D forming part of an ALARM circuit. This circuit has first and second bistable gates 10 and 11 with the output of the gate 10 connected to the "on" terminal of the gate 11. The output of the waveform shaping circuit for the sensor A is connected to the "on" terminal of the gate 10. A leading edge trigger 12 is connected between the pulse generator PG and the input terminal of the gate 10, and a trailing edge trigger 13 is connected to the "off" terminal of the gate 10 and to the input terminal of bistable gate 2. The output of the AND gate is connected to the "off" terminal of the gate 11, and the output of the gate 11 is connected through a latch circuit 14 to the amplifier AMP. The circuit is activated by the magnetic element a passing the sensor A, and the circuit is deactivated a short time after the magnetic element passes the sensor B. The circuit produces a signal when the delay between the receipt of the signal from the pulse generator and the signal from sensor A is longer than a permissible delay. The output is amplified in amplifier AMP and the output from the amplifier AMP is supplied to a lamp "AN" for indicating abnormal operation, to a sounding device BZ and to a relay for disconnecting the power supply to the drive for the belt.

Each of the sensors A and B is a kind of proximity sensor and comprises an iron core with a coil winding therearound. These sensors A and B are disposed at a predetermined distance $d$ from the belt 1 at one of the underside edges thereof, the sensor B being in the forward position in the belt advancing direction. The distance L between said sensors A and B along the belt 1 is somewhat longer than the length of the joint 2 in the belt 1. The pair of magnetic elements $a$ and $b$ are spaced at suitable and preferably equal distances from the forward and rear end of said joint 2, respectively. When the joint is unelongated, the distance $l'$ between the elements $a$ and $b$ is equal to the distance L between the sensors A and B so that elements $a$ and $b$ are simultaneously aligned with the sensors A and B during movement of the joint 2 past the sensors.

In operation, the magnetic elements $a$ and $b$ are sensed by the sensors A and B as they pass the sensors during the travel of the conveyor belt 1 in the counterclockwise direction, as seen in FIG. 1. As the elements $a$ and $b$ pass over the sensors A and B, respectively, said sensors each issue signal waves having a waveform corresponding to one cycle. These signal waves are transformed into pulses of a fixed amplitude by the wave form shaping circuits WFSC. The pulse from the WFSC for sensor B triggers the pulse generator PG to produce a pulse having a duration corresponding to the maximum permissible elongation of the belt joint 2. The alarm sequence is started by passage of element $a$ over sensor A. The pulse from the wave form shaping unit is applied to AND gate LC and to the "on" terminal of bistable gate 1. Since there is no signal from sensor B at this time the AND gate LC has no output. Bistable gate 1 operates in two states. When "on" the bistable gate passes the input signal directly to its output. When "off" the bistable gate blocks the input signal and has no output. The pulse from WFSC A corresponding to the passage of element $a$ over sensor A serves to turn bistable gate 1 to its "on" state. Next element $a$ passes over sensor B. The pulse from the wave form shaping circuit for sensor B is applied to pulse generator PG which produces a pulse with a duration corresponding to the maximum permissible elongation of the belt joint 2. This pulse is applied to AND gate LC and to both the leading edge trigger and trading edge trigger. The leading edge trigger produces a pulse of short duration corresponding to the leading edge of the pulse from PG. This pulse of short duration passes through bistable gate 1 unimpeded to the "on" terminal of bistable gate 2. Bistable gate 2 is similar to bistable gate 1 and upon receiving the pulse corresponding to the leading edge of the pulse from PG is turned "on".

If the belt joint 2 is elongated only within permissible limits, element $b$ passes over sensor A prior to the end of the pulse from PG. Since AND gate LC has inputs on both terminals it produces an output. The output of LC serves to light the normal belt condition indicating lamp N. In addition this output is applied to the "off" terminal of bistable gate 2 placing it in its "off" state and preventing the activation of the latch alarm.

If the belt joint 2 is elongated beyond permissible limits, element 6 passes over sensor A after the end of the pulse from PG. Since the signals on the input of AND gate LC do not occur together, AND gate LC does not produce an output, lamp N is not activated and bistable gate 2 is not turned off. The pulse from PG is applied to the trailing edge trigger. This element serves to produce a pulse of short duration corresponding to the end of the pulse from PG. This trailing edge pulse is applied to the input of bistable gate 2. Bistable gate 2 has been placed in its "on" state by the leading edge pulse and has not been turned "off" by a signal from LC. Thus the trailing edge trigger signal is passed directly to the latch circuit. Upon receipt of a signal, latch circuit activates power AMP which lights abnormal operation indicating lamp AN and/or sounding audio alarm BZ and/or activating relay RY to stop the belt. The latch circuit continues to activate power AMP until manually reset by the operator.

The pulse from trailing edge trigger is also applied to the "off" terminal of bistable gate 2. This makes bistable gate 1 unresponsive to the leading edge pulse. Thus during normal operation when element $b$ passes over sensor B delay indicating circuit D is unresponsive. The delay indicating circuit is unresponsive until bistable gate 1 is placed in its "on" state by element $a$ passing over sensor A on the next turn of the belt. Note that receipt by bistable gate 1 of an additional "on" signal due to element $b$ passing over sensor A and an additional "off" signal due to element $b$ passing over sensor B (delayed until the end of the pulse from PG) does not change the state of bistable gate 1 but merely assures that that element is in its proper state.

As is self-evident, if one of said magnetic elements $a$ and $b$ comes off the belt, this is detected as an excessive elongation.

As described hereinbefore, this invention makes possible the detection of an elongation of the joint of a conveyor belt before it reaches the brink of severance, thereby enabling workers in the concerned areas around the belt to be free from the fear of an impending disaster that may be caused by a break of the conveyor belt in the midst of its operation.

What is claimed is:

1. An apparatus for detecting elongation of the joint of a conveyor belt, comprising:
    a pair of sensors, each of which comprises an iron core having a coil winding therearound and said sensors being spaced at a predetermined distance from each other parallel with the conveyor belt and which distance is greater than the length of the joint along the belt, and said sensors being spaced a predetermined distance from one of the edges of the underside of the belt;
    a pair of magnetic elements fixed to the underside surface of the belt, said magnetic elements being spaced from each other a distance equal to the distance between said sensors which the joint is unelongated so that said sensors and elements are aligned during movement of said conveyor belt past said sensors;
    a waveform shaping circuit coupled to each of said sensors;
    a pulse generator coupled to one sensor which is spaced from the other sensor in the direction of movement of said conveyor belt for generating a pulse in response to the output of said sensor having a duration corresponding to the maximum permissible elongation of the joint of the conveyor belt;
    logic circuit means coupled to the outputs of said pulse generator and the waveform shaping circuit coupled to said other sensor including means for activating said logic circuit means when the first magnetic element passes said other sensor and for deactivating the logic circuit means after the first magnetic element passes the one sensor and before the second magnetic element passes said one sensor, and further including means for producing an output when a delay which is longer than the delay corresponding to the maximum permissible elongation of the joint occurs between the output of the waveform shaping circuits; and
    means coupled to the logic circuit means and actuated by the output of the logic circuit means for responding to an elongation of the joint which is greater than the maximum permissible elongation.

2. An apparatus as claimed in claim 1 in which said means coupled to said logic circuit means comprises an alarm means.

3. An apparatus as claimed in claim 1 in which said means coupled to said logic circuit means comprises a means for acting on drive means for the conveyor belt for stopping drive of the conveyor belt.

4. An apparatus as claimed in claim 1 in which said means coupled to said logic circuit means comprises an alarm means and means for acting on drive means for the conveyor belt for stopping drive of the conveyor belt.

5. An apparatus as claimed in claim 1 further comprises indicating means coupled to said logic circuit means for indicating less than maximum permissible elongation of the joint of said conveyor belt, and said logic circuit means includes means for producing an output when a delay which is shorter than the delay corresponding to the maximum permissible elongation of the joint occurs between the outputs of the waveform shaping circuits.

6. An apparatus as claimed in claim 1 in which said magnetic elements are equally spaced from said joint.

* * * * *